United States Patent
Takahashi

(10) Patent No.: US 8,411,994 B2
(45) Date of Patent: Apr. 2, 2013

(54) APPARATUS AND METHOD FOR IMAGE PROCESSING AND COMPUTER-READABLE STORAGE MEDIUM

(75) Inventor: Naoto Takahashi, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 12/353,877

(22) Filed: Jan. 14, 2009

(65) Prior Publication Data

US 2009/0180714 A1  Jul. 16, 2009

(30) Foreign Application Priority Data

Jan. 15, 2008  (JP) ................................. 2008-005764

(51) Int. Cl.
  G06K 9/36  (2006.01)
(52) U.S. Cl. ........................................ 382/276; 382/169
(58) Field of Classification Search ................... 348/254, 348/671, 672, 674, E9.054, E5.074; 375/E7.205; 382/169, 276
See application file for complete search history.

(56) References Cited

U.S. PATENT DOCUMENTS

| 7,024,036 | B2 * | 4/2006 | Shinbata ........................ 382/168 |
| 7,050,648 | B1 * | 5/2006 | Shinbata ........................ 382/274 |
| 7,113,649 | B2 * | 9/2006 | Gindele .......................... 382/274 |
| 7,564,582 | B2 * | 7/2009 | Shinbata et al. ................ 358/1.9 |
| 7,636,495 | B2 * | 12/2009 | Shinbata ........................ 382/274 |

FOREIGN PATENT DOCUMENTS

| EP | 440166 | 8/1991 |
| JP | 2663189 | 10/1997 |
| JP | 11-088688 | 3/1999 |
| JP | 2000-276605 | 10/2000 |
| JP | 2001-307064 | 11/2001 |
| JP | 2002-245453 | 8/2002 |
| JP | 2005-131268 A | 5/2005 |
| JP | 2006-031682 A | 2/2006 |
| JP | 2006-277044 A | 10/2006 |

* cited by examiner

*Primary Examiner* — Gregory F Cunningham
(74) *Attorney, Agent, or Firm* — Canon USA Inc. IP Division

(57) ABSTRACT

An input pixel value setting circuit sets at least two different input pixel values in a subject area of an input image. A dynamic range transforming circuit performs a process for transforming pixel values of the input image using a dynamic range transformation function in which output pixel values corresponding to the two different input pixel values become set output pixel values.

11 Claims, 7 Drawing Sheets

APPARATUS AND METHOD FOR IMAGE PROCESSING AND COMPUTER-READABLE STORAGE MEDIUM

BACKGROUND OF THE INVENTION

1. Field of the Invention

The present invention relates to an image processing apparatus and method for performing image processing on an input image, and in particular, relates to image processing for dynamic range transformation.

2. Description of the Related Art

In recent years, digital X-ray photographing apparatuses capable of outputting X-ray image data in digital form are becoming widespread as medical X-ray photographing apparatuses. Image processing is indispensable to such a digital X-ray photographing apparatus. The digital X-ray photographing apparatus (image processing apparatus) uses a variety of image processing on X-ray image data. One of important image processing is gray scale transformation processing for transforming captured x-ray image data into an image having easier-to-observe densities (brightnesses) and contrast.

As for the shape of a function used in the above-described gray scale transformation processing, for example, an S-shaped function as shown in FIG. 8 is generally used. This shape is similar to that of the characteristic curve for a silver-halide film. FIG. 8 is a prior art schematic diagram illustrating a characteristic curve used in typical gray scale transformation processing, the characteristic curve showing the relationship between an input pixel value and an output density value. A method of generating an S-shaped characteristic curve (gray scale transformation curve) shown in FIG. 8 is disclosed in, for example, Japanese Patent Laid-Open No. 11-88688. The method disclosed in Japanese Patent Laid-Open No. 11-88688 uses a function expressed by the following equation (5).

$$D(x) = OD_{min} + \frac{OD_{max} - OD_{min}}{2} \left\{ \frac{1}{1 + \exp\left(c\left(\frac{x_0 -}{(x-d)}\right)\right)} + \frac{1}{1 + \exp\left(ac\left(\frac{bx_0 -}{(x-d)}\right)\right)} \right\} \quad (5)$$

In the equation (5), let $OD_{max}$ and $OD_{min}$ be a maximum output density and a minimum output density, and let a and b denote constants. In addition, let c denote a grading and let d be an amount of translation. Changing those two parameters c and d can adjust densities and contrast in a desired region of interest to optimum values.

FIG. 9 is a prior art schematic diagram explaining an example of a method of transforming the gray scale of image data relating to X-ray photography in chest. In X-ray photography in chest, the region of most interest is typically a lung region. Accordingly, the parameters c and d are changed to provide such a contrast that a representative value (e.g., mean value) in lung regions indicates a predetermined density (for example, a density of 1.8D), thus optimally adjusting densities and contrast in the lung regions.

In the above-described gray scale transformation processing, in some cases, it is difficult to set the whole of a subject area within an optimum density range while maintaining contrast in a region of interest, depending on the body size of a subject or part of the body. For example, in X-ray photography in chest, since the chest includes lung regions where an X-ray is easy to pass and a mediastinum region where an X-ray is hard to pass, the dynamic range of a subject is very wide. Accordingly, when the contrast in the lung regions is optimized using the gray scale transformation function (gray scale transformation curve) shown in FIG. 9, densities in the mediastinum region become too low. Disadvantageously, in some cases, it is difficult to simultaneously observe the lung regions and the mediastinum region.

To overcome such a disadvantage, a typical method compresses the dynamic range of an image while keeping contrast in a fine-structure portion prior to gray scale transformation. For example, when let $S_{org}$ be an input image and Sus denote a blurred image obtained by moving averages of the input image using a mask size of M×M pixels, this method is expressed by the following equation (6).

$$S_{proc} = S_{org} + f(Sus) \quad (6)$$

A function "f( )" in the equation (6) is a generally monotonically decreasing function as shown in FIG. 10. FIG. 10 is a prior art schematic diagram illustrating a dynamic range transformation function.

The equation (6) can also be expressed as the following equation (7).

$$S_{proc} = (S_{org} - Sus) + (f(Sus) + Sus) \quad (7)$$
$$= (S_{org} - Sus) + f1(Sus)$$

A function "f1( )" in the equation (7) is expressed as a generally monotonically increasing function as shown in FIG. 11. FIG. 11 is a prior art schematic diagram showing an example of a dynamic range transformation function. Since "$S_{org}$–Sus" in the equation (7) corresponds to a high frequency component, this function can be regarded as gray scale transformation limited only to a low frequency component. Densities of a finally output image are obtained as a combination of the function "f1( )" in the equation (7) and the gray scale transformation function in the equation (5). Advantageously, therefore, densities in a low density region, such as the mediastinum region, can be increased.

When the function "f( )" in the equation (6) is changed, densities in a high density region, such as a skin, can be reduced. This method is disclosed in Japanese Patent No. 2663189. In the background of the above-described image processing techniques, however, the related-art methods have the following disadvantages.

As for the technique disclosed in Japanese Patent Laid-Open No. 11-88688, although densities and contrast in a region of interest are optimized, a variation in dynamic range due to individual differences among subjects is not taken into consideration. Accordingly, in some cases, the whole of a subject is not set within an optimum density range. A reduction in the gradient of a gray scale transformation curve using the grading c can allow the whole of the subject to be set within the optimum density range. In this case, however, since the gradient of the gray scale transformation curve cannot be partially adjusted, contrast in a region of interest has to be sacrificed. In other words, it is difficult to optimally adjust the gray scale transformation curve in accordance with the dynamic range of the subject while maintaining the contrast in the region of interest.

According to the technique disclosed in Japanese Patent No. 2663189, it is possible to set the whole of a subject within an optimum density range. In the above-described techniques, however, a process of setting the whole of a subject within an optimum density range is regarded as independent of the gray scale transformation processing. How the effect of this process is reflected in an image which has undergone gray scale transformation is not taken into consideration. Therefore, there is no guarantee that the dynamic range of a subject is surely set within an optimum density range after gray scale transformation. For example, in a case shown in FIG. 11, the gradient is constant in a range where the parameter Sus is at or below a value Base. Disadvantageously, the dynamic range is uniformly compressed in a region of interest or in the vicinity thereof where it is not preferable to compress the dynamic range, depending on the set value Base.

SUMMARY OF THE INVENTION

An embodiment of the present invention has been made in consideration of the above-described problems. The present invention provides a technique for transforming pixel values in a subject area into an optimum density (or brightness) range while keeping desired densities (or brightnesses) and contrast in a region of interest.

That is, an aspect of the present invention provides an image processing apparatus comprising: an input pixel value setting unit configured to set a first input pixel value and a second input pixel value in a subject area of an input image, wherein the first input pixel value is different from the second input pixel value; and a dynamic range transforming unit configured to perform a process for transforming pixel values of the input image using a transformation curve in which input pixel values set by the input pixel value setting unit become set output pixel values, wherein the transformation curve is generated so that the gradient at at least one of the input pixel values set by the input pixel value setting unit becomes a predetermined value.

Another aspect of the present invention further provides a method for image processing, the method comprising: setting a first input pixel value and a second input pixel value in a subject area of an input image, wherein the first input pixel value is different from the second input pixel value; and performing a process for transforming a part or all of pixel values of the input image using a transformation curve in which set input pixel values become set output pixel values, wherein the transformation curve is generated so that the gradient at at least one of the set input pixel values becomes a predetermined value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings. In the following description, it is assumed that an image processing apparatus according to the present invention is applied to an X-ray photographing apparatus. Although X-ray photographing apparatuses for photographing using X-rays will be described in the following embodiments of the present invention, radiation is not limited to X-ray radiation. Any radiographing apparatus using, for example, $\alpha$-rays, $\beta$-rays, $\gamma$-rays, or similar radiation may be used.

Figure 1:
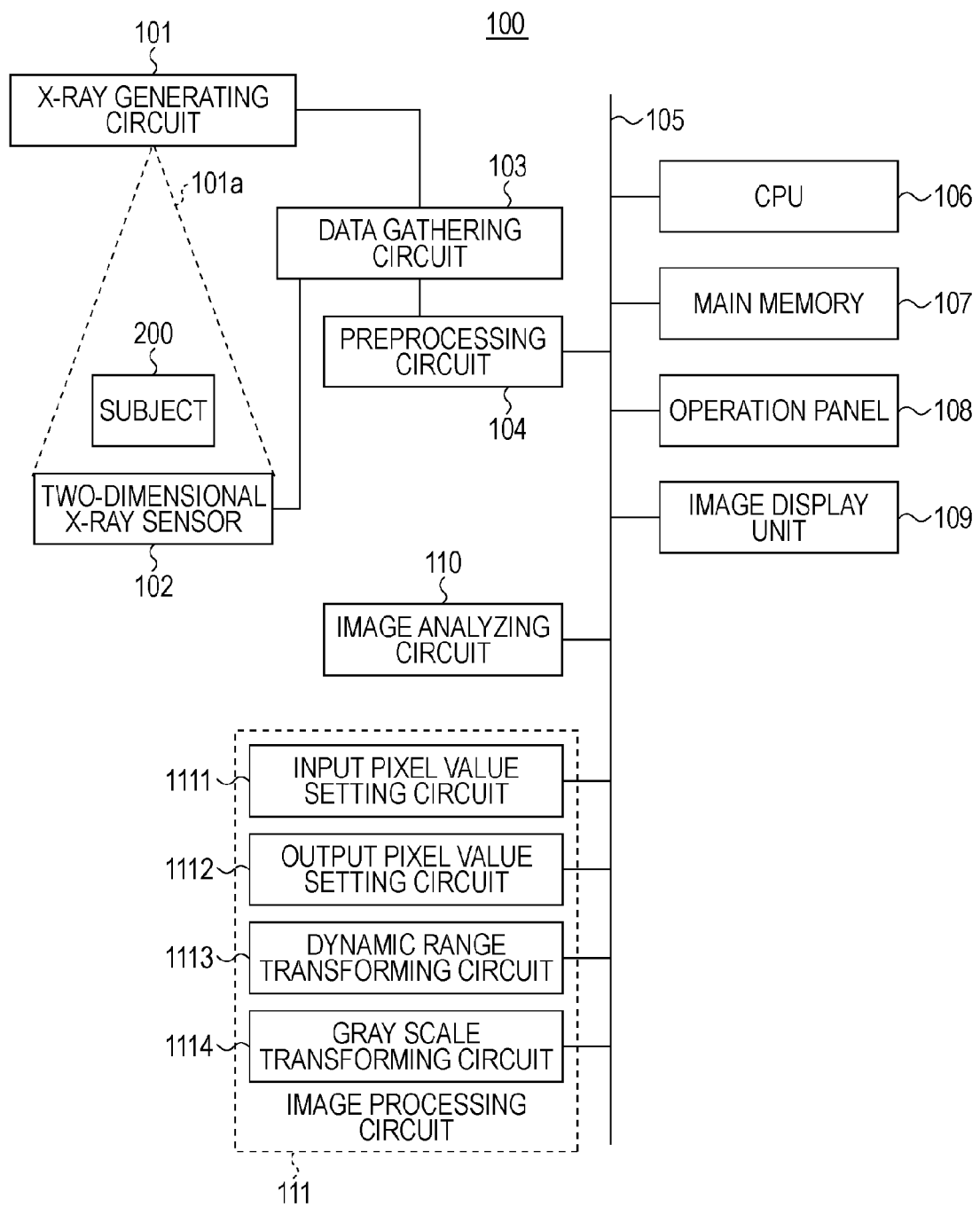
FIG. 1 is a schematic diagram illustrating the schematic structure of an X-ray photographing apparatus (image processing apparatus) according to a first embodiment (and a second embodiment) of the present invention.

FIG. 1 is a schematic diagram illustrating the schematic structure of an X-ray photographing apparatus (image processing apparatus) according to a first embodiment of the present invention. The X-ray photographing apparatus, indicated at 100, shown in FIG. 1 serves as an image processing apparatus having a function of performing effective image processing upon outputting an image captured with X-rays onto a film or a monitor (an image display unit 109).

The X-ray photographing apparatus 100 includes an X-ray generating circuit 101, a two-dimensional X-ray sensor 102, a data gathering circuit 103, a preprocessing circuit 104, a bus 105, a CPU 106, a main memory 107, an operation panel 108, the image display unit 109, an image analyzing circuit 110, and an image processing circuit 111. The preprocessing circuit 104, the CPU 106, the main memory 107, the operation panel 108, the image display unit 109, the image analyzing circuit 110, and the image processing circuit 111 are connected through the bus 105 such that data can be transferred between those components, i.e., the components can communicate with one another.

The data gathering circuit 103 is communicatably connected to the preprocessing circuit 104 and is further communicatably connected to the X-ray generating circuit 101 and the two-dimensional X-ray sensor 102. The image processing circuit 111 includes an input pixel value setting circuit 1111, an output pixel value setting circuit 1112, a dynamic range transforming circuit 1113, and a gray scale transforming circuit 1114 such that the circuits 1111 to 1114 are connected to the bus 105.

In the X-ray photographing apparatus 100 having the above-described structure, the main memory 107 stores a program and various data items necessary for processing by the CPU 106 and also functions as a working memory for the CPU 106. The CPU 106 controls all of operations of the X-ray photographing apparatus 100 using the program and various data items stored in the main memory 107 in accordance with an operation input from the operation panel 108. The X-ray photographing apparatus 100 operates as follows.

When a user inputs a photographing instruction through the operation panel 108, the CPU 106 transmits the photographing instruction through the preprocessing circuit 104 to the data gathering circuit 103. The CPU 106 then controls the X-ray generating circuit 101 and the two-dimensional X-ray sensor 102 through the data gathering circuit 103 to carry out X-ray photography.

In the X-ray photography, the X-ray generating circuit 101 emits an X-ray beam 101a to a subject 200. The X-ray beam 101a emitted from the X-ray generating circuit 101 passes through the subject 200 while attenuating and then reaches the two-dimensional X-ray sensor 102. The two-dimensional X-ray sensor 102 generates an X-ray image signal based on the X-ray beam 101a passing through the subject 200 and outputs the generated signal. In the present embodiment, it is assumed that the subject 200 is a human body. In other words, the X-ray image output from the two-dimensional X-ray sensor 102 is a human body image.

The data gathering circuit 103 converts the X-ray image signal output from the two-dimensional X-ray sensor 102 into a predetermined digital signal and supplies the signal as X-ray image data to the preprocessing circuit 104.

The preprocessing circuit 104 performs preprocessing, such as offset correction and gain correction, on the signal (X-ray image data) supplied from the data gathering circuit 103. The X-ray image data subjected to the preprocessing by the preprocessing circuit 104 is temporarily stored as original image data into the main memory 107 through the bus 105 under the control of the CPU 106 and is also supplied to the image analyzing circuit 110.

The image analyzing circuit 110 performs image analysis on the original image data (input image data) supplied through the bus 105 to recognize a field to be irradiated (hereinafter, referred to as "irradiation field"), a subject area, and a region of interest (hereinafter, also referred to as "ROI") in the subject area. In this instance, the irradiation field is an area where irradiating only a necessary portion, so-called "irradiation field limiting", has been performed in a photographed area to prevent scattering from an unnecessary portion in order to prevent a reduction in contrast. Information obtained through the image analyzing circuit 110 is supplied through the bus 105 to the image processing circuit 111 under the control of the CPU 106.

The input pixel value setting circuit 1111 in the image processing circuit 111 sets predetermined input pixel values. Specifically, the input pixel value setting circuit 1111 sets at least two different input pixel values in the subject area of the input image.

The output pixel value setting circuit 1112 in the image processing circuit 111 sets predetermined output pixel values. Specifically, the output pixel value setting circuit 1112 sets output pixel values corresponding to the input pixel values (at least two different input pixel values) set by the input pixel value setting circuit 1111.

The dynamic range transforming circuit 1113 in the image processing circuit 111 transforms a dynamic range on the basis of the input pixel values set by the input pixel value setting circuit 1111 and the output pixel values set by the output pixel value setting circuit 1112. Specifically, the dynamic range transforming circuit 1113 performs a process for transforming a part or all of pixel values of the input image using a dynamic range transformation function in which the input pixel values set by the input pixel value setting circuit 1111 become the output pixel values set by the output pixel value setting circuit 1112. In this instance, the dynamic range transformation function is generated so that the gradient at one of the input pixel values set by the input pixel value setting circuit 1111 becomes a predetermined value. In addition, a function in which the gradient generally monotonically increases or decreases in a range between at least two different pixel values can be used as the dynamic range transformation function.

The gray scale transforming circuit 1114 in the image processing circuit 111 transforms the gray scale of the image processed by the dynamic range transforming circuit 1113. Specifically, the gray scale transforming circuit 1114 performs a process for transforming pixel values of the image processed by the dynamic range transforming circuit 1113 into pixel values corresponding to densities or brightnesses using a gray scale transformation function.

A process by the image processing circuit 111 in the X-ray photographing apparatus 100 with the above-described structure in accordance with the first embodiment of the present invention will now be concretely described with reference to a flowchart of FIG. 2.

Figure 2:
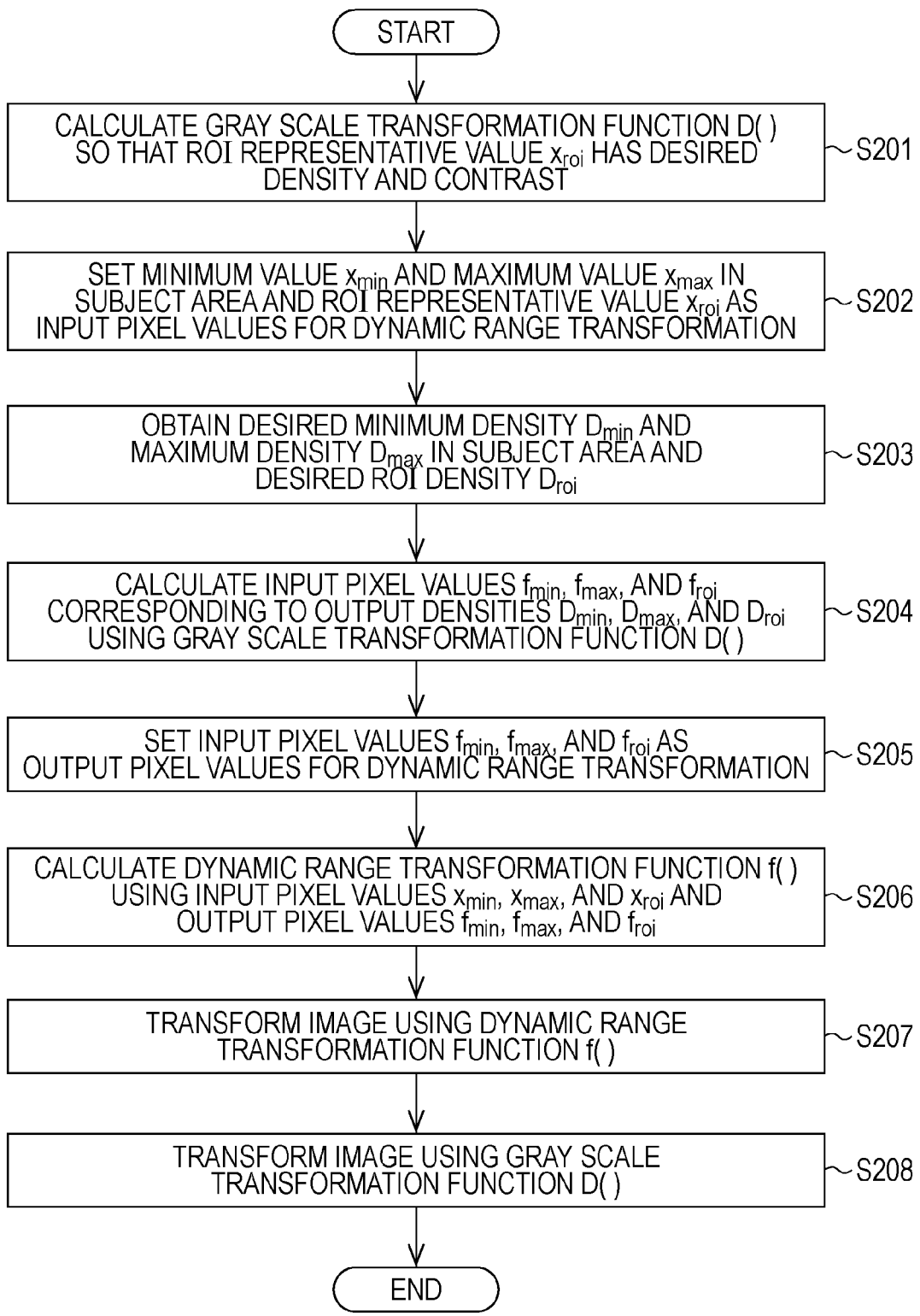
FIG. 2 is a flowchart showing an exemplary procedure of the X-ray photographing apparatus (image processing apparatus) according to the first embodiment of the present invention.

FIG. 2 is a flowchart showing an exemplary procedure of the X-ray photographing apparatus (image processing apparatus) according to the first embodiment of the present invention. Specifically, the process in the flowchart of FIG. 2 is carried out when the CPU 106 executes the program stored in the main memory 107 to control the image processing circuit 111.

Before starting the process in FIG. 2, the CPU 106 transfers original image data obtained by the preprocessing circuit 104 through the bus 105 to the image analyzing circuit 110 disposed upstream of the image processing circuit 111. The image analyzing circuit 110 analyzes an original image (input image) based on the original image data to recognize an irradiation field, a subject area, and a region of interest in the subject area.

A method of image analysis by the image analyzing circuit 110 is not especially limited. As for a method of recognizing an irradiation field, for example, a method disclosed in Japanese Patent Laid-Open No. 2001-307064 assigned to the same assignee as this application can be used. According to the method disclosed in Japanese Patent Laid-Open No. 2001-307064, irradiation-field edgenesses are evaluated using patterns of pixel values of a target pixel and surrounding pixels, so that an irradiation field can be recognized with high accuracy.

As for a method of recognizing a subject area, the following method may be used. Specifically, a value that is 90% of a maximum pixel value in an irradiation field is calculated as Th1. Then, an image f1(x, y) is obtained using the following expression (8), the image f1(x, y) being the resultant image obtained by eliminating a region (hereinafter, referred to as "non-irradiation region") where the X-ray beam 101a directly reaches the two-dimensional X-ray sensor 102 without passing through the subject 200 and a body region adjacent to the non-irradiation region with a predetermined distance therebetween from an input image f(x, y).

$$f1(x, y) = f(x, y) \times \prod_{x1=-d1}^{x1=d1} \prod_{y1=-d2}^{y1=d2} \text{sign}(x + x1, y + y1) \quad (8)$$

$$\text{sign}(x, y) = \begin{cases} 0, & f(x, y) \geq Th1 \\ 1, & f(x, y) < Th1 \end{cases}$$

In the expression (8), parameters d1 and d2 denote constants for determining the predetermined distance used upon eliminating the non-irradiation region and the body region adjacent to the non-irradiation region with the predetermined distance therebetween from the input image f(x, y). Those parameters are set on the basis of the size of the input image f(x, y).

The image analyzing circuit 110 calculates a minimum value and a maximum value of pixel values excluding a pixel value 0 from the image f1(x, y) from which the non-irradiation region and the body region are eliminated and recognizes an area including pixel values ranging from the minimum pixel value to the maximum pixel value as a subject area.

As for a method of recognizing a region of interest in a subject area, various methods, e.g., a method of recognizing a region of interest from the histogram of an input image and a method of recognizing a region of interest from the two-dimensional structure of an input image are available. Since a region of interest differs from one photographing target part to another, the region of interest may be recognized using a desired method from various methods on the basis of, for example, photographing target part set through the operation panel 108.

Specifically, when photographing target part is, for example, a cervical vertebra, a method disclosed in Japanese Patent Laid-Open No. 2002-245453 assigned to the same assignee as this application can be used. According to the method disclosed in Japanese Patent Laid-Open No. 2002-245453, the border line of a neck region in a subject area is extracted, so that a region of interest in the cervical vertebra can be recognized with high accuracy. When photographing target part is, for example, chest, a method disclosed in Japanese Patent Laid-Open No. 2000-276605 assigned to the same assignee as this application can be used. According to the method disclosed in Japanese Patent Laid-Open No. 2000-276605, an area is restricted on the basis of a spatial position relationship in an image, so that a region of interest in a lung region can be recognized with high accuracy.

The original image data (input image data) transferred to the image analyzing circuit 110 is not necessarily image data representing a full-size image. Image data representing a reduced image with any size may be used.

Figure 3:
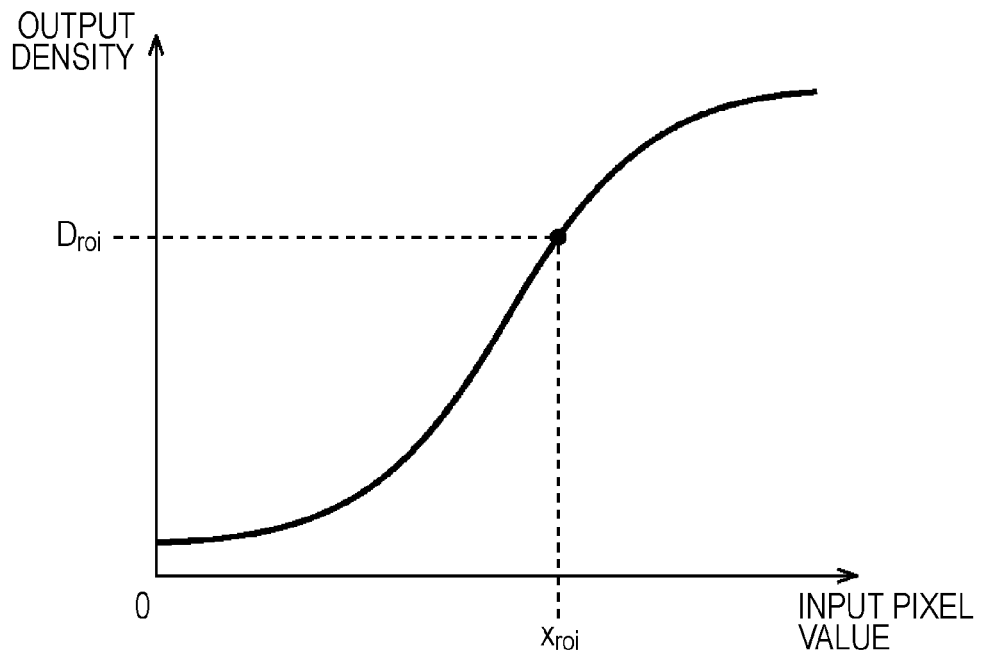
FIG. 3 is a schematic diagram explaining an exemplary method for calculating a gray scale transformation function in accordance with the embodiment of the present invention.

After that, the flowchart shown in FIG. 2 is started. After the flowchart of FIG. 2 is started, in step S201, the gray scale transforming circuit 1114 calculates a gray scale transformation function D( ) in which a representative value $x_{roi}$ in a region of interest (hereinafter, "ROI representative value $x_{roi}$") has a desired density and contrast set through the operation panel 108. Specifically, the gray scale transformation function D( ) in which the ROI representative value $x_{roi}$ has a desired density $D_{roi}$ and contrast as shown in FIG. 3 is calculated using the above-described S-shaped characteristic curve (gray scale transformation curve) disclosed in Japanese Patent Laid-Open No. 11-88688 assigned to the same assignee as this application. FIG. 3 is a schematic diagram explaining an example of a method for calculating a gray scale transformation function in accordance with the present embodiment of the present invention.

As for the ROI representative value $x_{roi}$, for example, a mean value of pixel values in the region of interest recognized by the image analyzing circuit 110 may be used. Alternatively, an image may be displayed on the image display unit 109 and a mean value of pixel values of a region of interest manually set by the user through the operation panel 108 may be used.

In step S202, the input pixel value setting circuit 1111 sets a minimum value $x_{min}$ and a maximum value $x_{max}$ of pixel values in the subject area and the ROI representative value $x_{roi}$ as input pixel values relating to dynamic range transformation. In this instance, the minimum value and the maximum value of the pixel values in the subject area recognized by the image analyzing circuit 110 are used as the minimum value $x_{min}$ and the maximum value $x_{max}$. As for the ROI representative value $x_{roi}$, the same value as the ROI representative value $x_{roi}$ used upon calculating the gray scale transformation function D( ) is used.

In the present embodiment, it is necessary in step S202 to set at least two different input pixel values in the subject area of the input image. Specifically, the ROI representative value $x_{roi}$ obtained as a value calculated from a predetermined region (region of interest) in the subject area is set as one of the at least two different input pixel values. In addition, the maximum value $x_{max}$ or the minimum value $x_{min}$ of the pixel values in the subject area is set as the other one of the at least two different input pixel values. In step S202, both of the maximum value $x_{max}$ and the minimum value $x_{min}$ of the pixel values in the subject area are set.

In step S203, the output pixel value setting circuit 1112 obtains a desired minimum density $D_{min}$ and a desired maximum density $D_{max}$ in the subject area and a desired density $D_{roi}$ in the region of interest (hereinafter, referred to as "ROI density $D_{roi}$"). Specifically, in the present embodiment, the minimum density $D_{min}$ and the maximum density $D_{max}$ in the subject area are set to any values in accordance with information about which density range the user wants to set the subject area in, the information being input by the user through the operation panel 108. As for the ROI density $D_{roi}$, the same value as the desired density $D_{roi}$ used upon calculating the gray scale transformation function D( ) is used.

Figure 4:
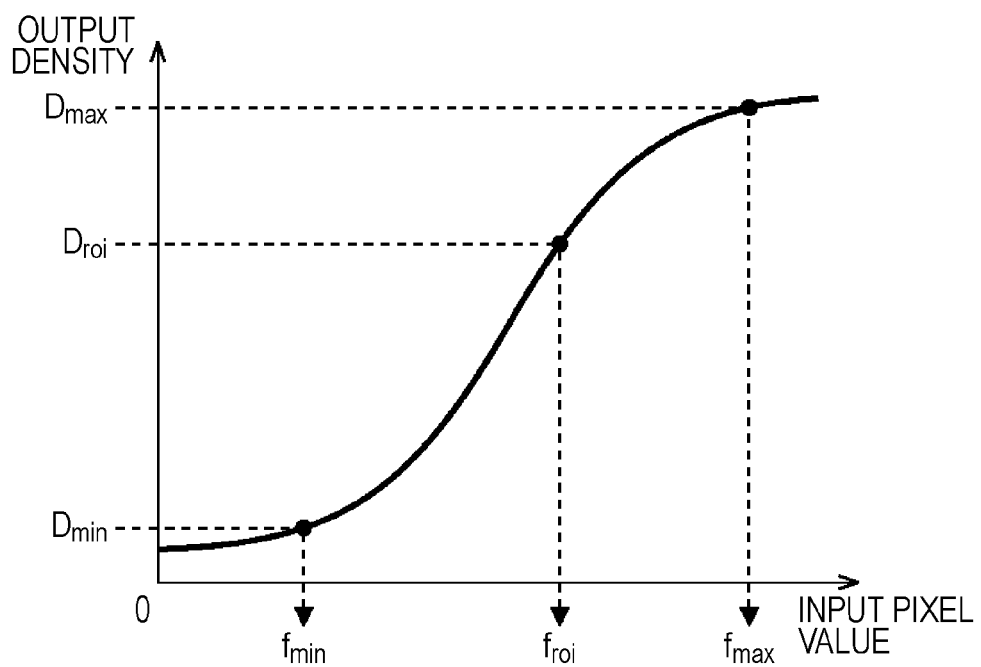
FIG. 4 is a schematic diagram explaining an exemplary method for setting output pixel values in accordance with the embodiment of the present invention.

In step S204, the gray scale transforming circuit 1114 calculates input pixel values $f_{min}$, $f_{max}$, and $f_{roi}$ respectively corresponding to the minimum density $D_{min}$ and the maximum density $D_{max}$ in the subject area and the ROI density $D_{roi}$ on the basis of the gray scale transformation function D( ) calculated in step S201. Specifically, as shown in FIG. 4, the input pixel values $f_{min}$, $f_{max}$, and $f_{roi}$ corresponding to the minimum density $D_{min}$ and the maximum density $D_{max}$ in the subject area and the ROI density $D_{roi}$ are calculated using a function $D^{-1}( )$ inverse to the gray scale transformation function D( ). FIG. 4 is a schematic diagram explaining an example of a method of setting output pixel values in accordance with the present embodiment of the present invention. When the above-described inverse function $D^{-1}( )$ cannot be algebraically calculated, the input pixel values $f_{min}$, $f_{max}$, and $f_{roi}$ may be calculated using, for example, a direct search method, such as bisection or linear inverse interpolation, or successive approximation, such as the Newton-Raphson method or Bailey method. Since the direct search method and the successive approximation are known, explanation of those methods is omitted. In the present embodiment, the gray scale transforming circuit 1114 performs processing in step S204. For example, the output pixel value setting circuit 1112 may perform this processing.

In step S205, the output pixel value setting circuit 1112 sets the input pixel values $f_{min}$, $f_{max}$, and $f_{roi}$ calculated in step S204 as output pixel values for dynamic range transformation. Consequently, output pixel values $f_{min}$, $f_{max}$, and $f_{roi}$ for dynamic range transformation are set.

In step S206, the dynamic range transforming circuit 1113 calculates a dynamic range transformation function f( ) on the basis of the input pixel values set by the input pixel value setting circuit 1111 and the output pixel values set by the output pixel value setting circuit 1112. Specifically, the dynamic range transforming circuit 1113 calculates the dynamic range transformation function f( ) on the basis of the input pixel values $x_{min}$, $x_{max}$, and $x_{roi}$ and the output pixel values $f_{min}$, $f_{max}$, and $f_{roi}$ using the following expression (9).

$$f(x) = \begin{cases} f_{min}, & x < x_{min} \\ f_l(x), & x_{min} \le x < x_{roi} \\ f_u(x), & x_{roi} \le x \le x_{max} \\ f_{max}, & x > x_{max} \end{cases} \quad (9)$$

The dynamic range transformation function $f_l(\ )$ in the expression (9) is a function for transforming input pixel values ranging from the value $x_{min}$ (inclusive) to the value $x_{roi}$ (exclusive) (i.e., values below the input pixel value $x_{roi}$) to output pixel values ranging from the value $f_{min}$ (inclusive) to the value $f_{roi}$ (exclusive). This function can be expressed by the following expression (10).

$$f_l(x) = (f_{roi} - f_{min}) \times \left( \frac{x - x_{min}}{x_{roi} - x_{min}} \right)^{\frac{1}{\gamma_l}} + f_{min} \quad (10)$$

$$\gamma_l = \frac{f_{roi} - f_{min}}{x_{roi} - x_{min}}$$

The dynamic range transformation function $f_u(\ )$ in the expression (9) is a function for transforming the range from the value $x_{roi}$ to the value $x_{max}$ (i.e., values at and above the input pixel value $x_{roi}$) to the range from the value $f_{roi}$ to the value $f_{max}$. This function can be expressed by the following expression (11).

$$f_u(x) = (f_{roi} - f_{max}) \times \left( \frac{x_{max} - x}{x_{max} - x_{roi}} \right)^{\frac{1}{\gamma_u}} + f_{max} \quad (11)$$

$$\gamma_u = \frac{f_{max} - f_{roi}}{x_{max} - x_{roi}}$$

Figure 5:
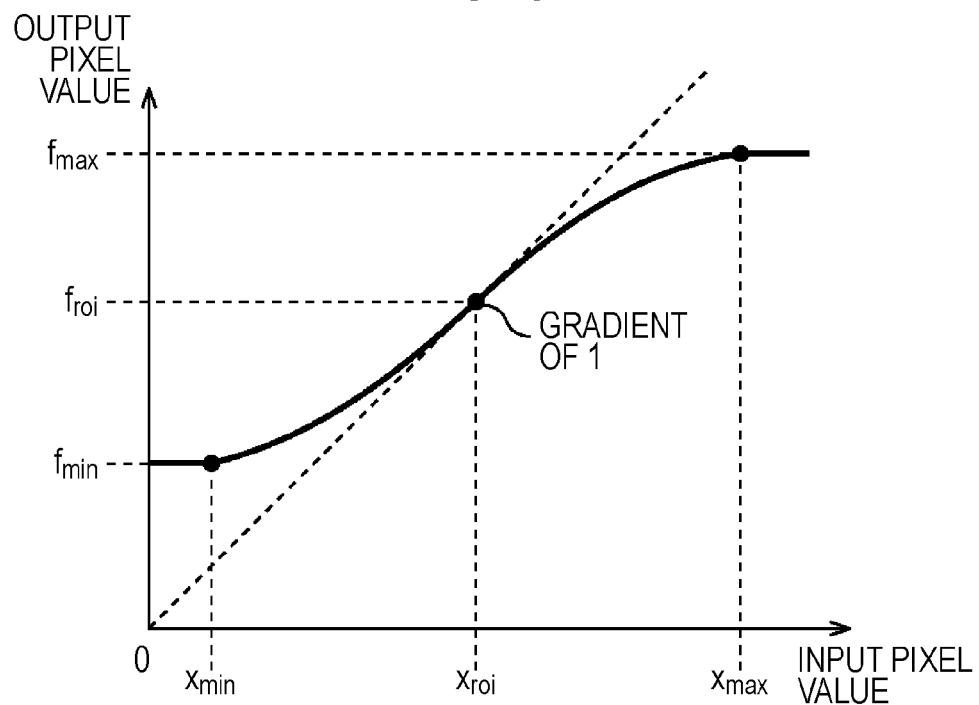
FIG. 5 is a schematic diagram illustrating a dynamic range transformation function in accordance with the embodiment of the present invention.

The dynamic range transformation function f( ) in this case has a shape shown in, for example, FIG. 5. FIG. 5 is a schematic diagram illustrating a dynamic range transformation function in accordance with the present embodiment of the present invention. Using the dynamic range transformation function shown in FIG. 5, the input pixel value $x_{roi}$ can be transformed into a desired output pixel value $f_{roi}$ and the range of input pixel values $x_{min}$ to $x_{max}$ can be transformed into the desired range of output pixel values $f_{min}$ to $f_{max}$. Referring to FIG. 5, the gradient at the output pixel value plotted against the input pixel value $x_{roi}$ is 1. In this function, as an input pixel value is farther away from the input pixel value $x_{roi}$, the gradient gradually increases. In other words, a fluctuation in contrast can be minimized in the vicinity of the input pixel value $x_{roi}$ in the region of interest and the dynamic range in the subject area can be transformed into a desired dynamic range.

In the above-described dynamic range transformation function f( ), an output pixel value is fixed to a constant value in each of the range where input pixel values are at and below the value $x_{min}$ and the range where input pixel values are at and above the value $x_{max}$. Since those ranges are generally unnecessary portions, there is no problem. However, the subject area may be included in the range where input pixel values are at and below the value $x_{min}$ or the range where input pixel values are at and above the value $x_{max}$ depending on the recognition accuracy at which the subject area is recognized by the image analyzing circuit 110.

In consideration of such a case, a maximum gradient limit $a_{max}$ ($a_{max} > 1$, for example, 5.0) and a minimum gradient limit $a_{min}$ ($a_{min} < 1$, for example, 0.2) may be set and the dynamic range transformation function f( ) may be calculated using the following expression (12).

$$f(x) = \begin{cases} a_l(x - x_{al}) + f_l(x_{al}), & x < x_{al} \\ f_l(x), & x_{al} \le x < x_{roi} \\ f_u(x), & x_{roi} \le x \le x_{au} \\ a_u(x - x_{au}) + f_u(x_{au}), & x > x_{au} \end{cases} \quad (12)$$

$$a_l = \begin{cases} a_{min}, & \gamma_l < 1 \\ 1, & \gamma_l = 1 \\ a_{max}, & \gamma_l > 1 \end{cases}, \quad a_u = \begin{cases} a_{min}, & \gamma_u < 1 \\ 1, & \gamma_u = 1 \\ a_{max}, & \gamma_u > 1 \end{cases}$$

In the expression (12), let $x_{al}$ be an input pixel value that satisfies $a_{max} = f'_l(x_{al})$ and let $x_{au}$ be an input pixel value that satisfies $a_{max} = f'_u(x_{au})$. The input pixel value $x_{al}$ denotes a pixel value at or below an input pixel value $x_a$ and the input pixel value $x_{au}$ denote a pixel value at or above an input pixel value $x_a$. Those input pixel values can be expressed by the following expression (13).

$$x_{al} = \begin{cases} x_{min} + (x_{roi} - x_{min}) \times \\ \left( \frac{a_l \gamma_l (x_{roi} - x_{min})}{f_{roi} - f_{min}} \right)^{\frac{\gamma_l}{1 - \gamma_l}}, & \gamma_l \ne 1 \\ x_{min}, & \gamma_l = 1 \end{cases} \quad (13)$$

$$x_{au} = \begin{cases} x_{max} + (x_{max} - x_{roi}) \times \\ \left( \frac{a_u \gamma_u (x_{roi} - x_{max})}{f_{roi} - f_{max}} \right)^{\frac{\gamma_u}{1 - \gamma_u}}, & \gamma_u \ne 1 \\ x_{max}, & \gamma_u = 1 \end{cases}$$

Figure 6:
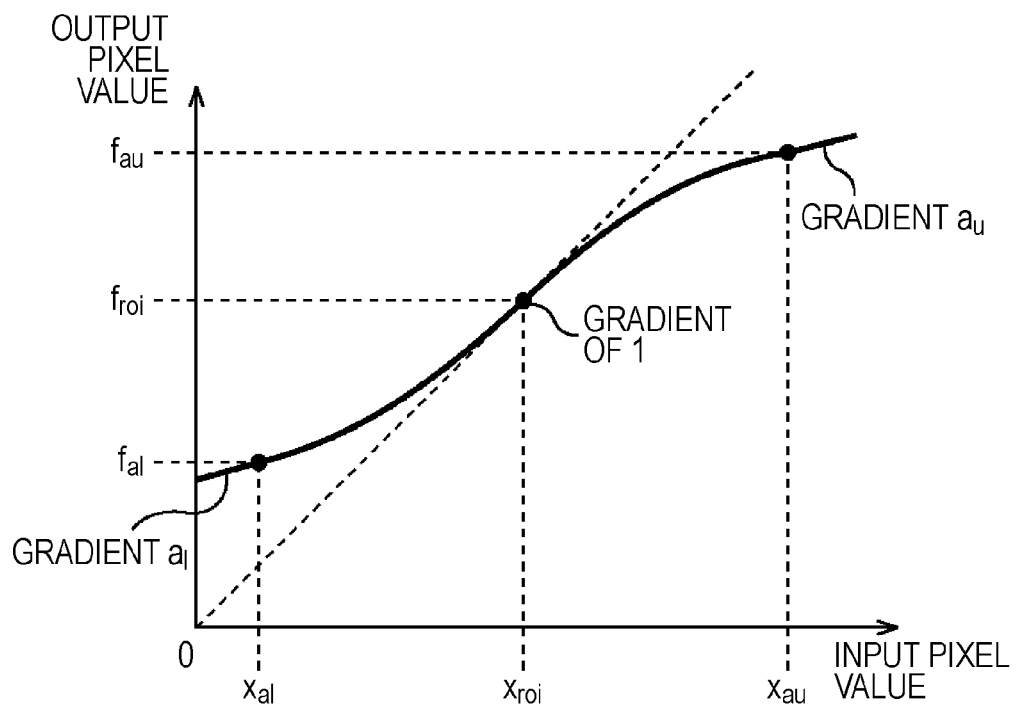
FIG. 6 is a schematic diagram illustrating a dynamic range transformation function in accordance with the embodiment of the present invention.

The dynamic range transformation function f( ) in this case has a shape shown in FIG. 6. FIG. 6 is a schematic diagram illustrating a dynamic range transformation function in accordance with the present embodiment of the present invention. In the dynamic range transformation function in FIG. 6, the dynamic range is transformed so that the gradient at each of input pixel values at and below the value $x_{al}$ and the gradient at each of input pixel values at and above the value $x_{au}$ are not at or above the maximum gradient limit $a_{max}$ and at or below the minimum gradient limit $a_{min}$. In this case, although the range of input pixel values $x_{min}$ to $x_{max}$ is not transformed into the range of desired output pixel values $f_{min}$ to $f_{max}$ in a strict sense, the subject area can be prevented from being clipped due to misrecognition by the image analyzing circuit 110.

In the above-described dynamic range transformation function f( ) expressed by the expressions (9) and (12), both of the dynamic range where input pixel values are below the value $x_{roi}$ and that where input pixel values are at and above the value $x_{roi}$ are transformed. The present embodiment is not limited to the transformation. In the present embodiment, a dynamic range transformation function in which any one of the dynamic range where input pixel values are at and below the value $x_{roi}$ and that where input pixel values are at and above the value $x_{roi}$ is transformed may be used. A concrete example will be described below.

A dynamic range transformation function for transforming only the dynamic range where input pixel values are at and below the value $x_{roi}$ can be expressed as the following expression (14).

$$f(x) = \begin{cases} f_{min}, & x < x_{min} \\ f_l(x), & x_{min} \le x \le x_{roi} \\ x - x_{roi} + f_{roi}, & x > x_{roi} \end{cases} \quad (14)$$

A dynamic range transformation function for transforming only the dynamic range where input pixel values are at and above the value $x_{roi}$ can be expressed by the following expression (15).

$$f(x) = \begin{cases} x - x_{roi} + f_{roi}, & x < x_{roi} \\ f_u(x), & x_{roi} \le x \le x_{max} \\ f_{max}, & x > x_{max} \end{cases} \quad (15)$$

As described above, the dynamic range transformation function f( ) is calculated in step S206.

In step S207, the dynamic range transforming circuit 1113 transforms pixel values of the input image (original image) using the dynamic range transformation function f( ) calculated in step S206.

In step S208, the gray scale transforming circuit 1114 transforms the input-image pixel values, transformed in step S207 by the dynamic range transforming circuit 1113, using the gray scale transformation function D( ) calculated in step S201. The process of FIG. 2 then terminates.

As described above, the dynamic range transformation function is calculated so that the dynamic range of a subject area is included in a desired density range (or brightness range) after gray scale transformation and an ROI representative value has a desired density (or brightness). In addition, the dynamic range transformation function is calculated so as to minimize a fluctuation in contrast in the vicinity of a region of interest before and after dynamic range transformation. Advantageously, according to the present embodiment, densities (brightnesses) in the subject area can be transformed into the optimum density (or brightness) range while the desired densities (or brightnesses) and contrast in the region of interest are being kept independently of the dynamic range of the subject area or a gray scale transformation curve.

An X-ray photographing apparatus (image processing apparatus) according to a second embodiment has the same schematic structure as that of the X-ray photographing apparatus according to the first embodiment shown in FIG. 1. A process by the image processing circuit 111 in the X-ray photographing apparatus 100 according to the second embodiment will be concretely described with reference to a flowchart of FIG. 7.

Figure 7:
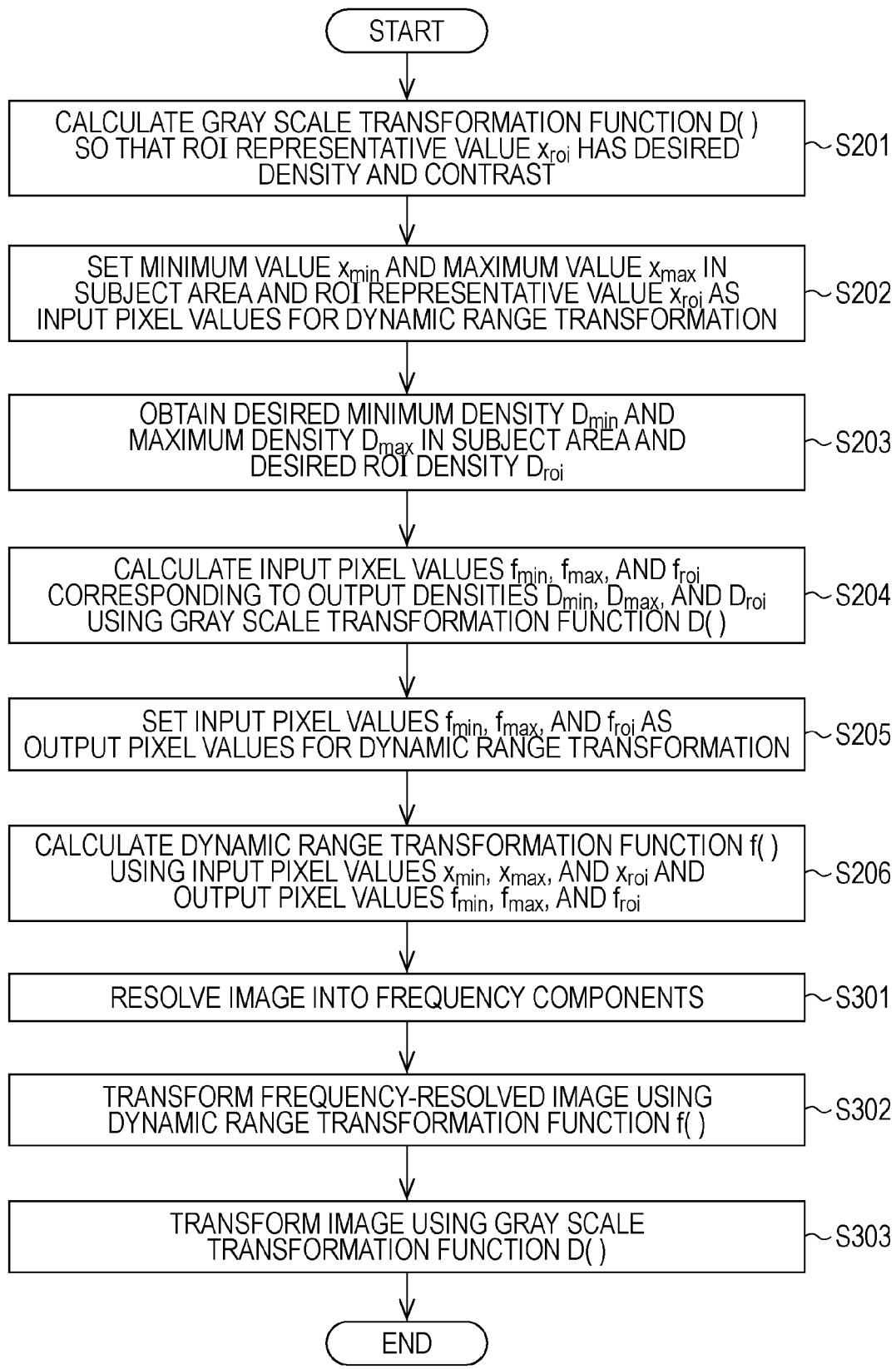
FIG. 7 is a flowchart showing an exemplary procedure of the X-ray photographing apparatus (image processing apparatus) according to the second embodiment of the present invention.
Figure 8:
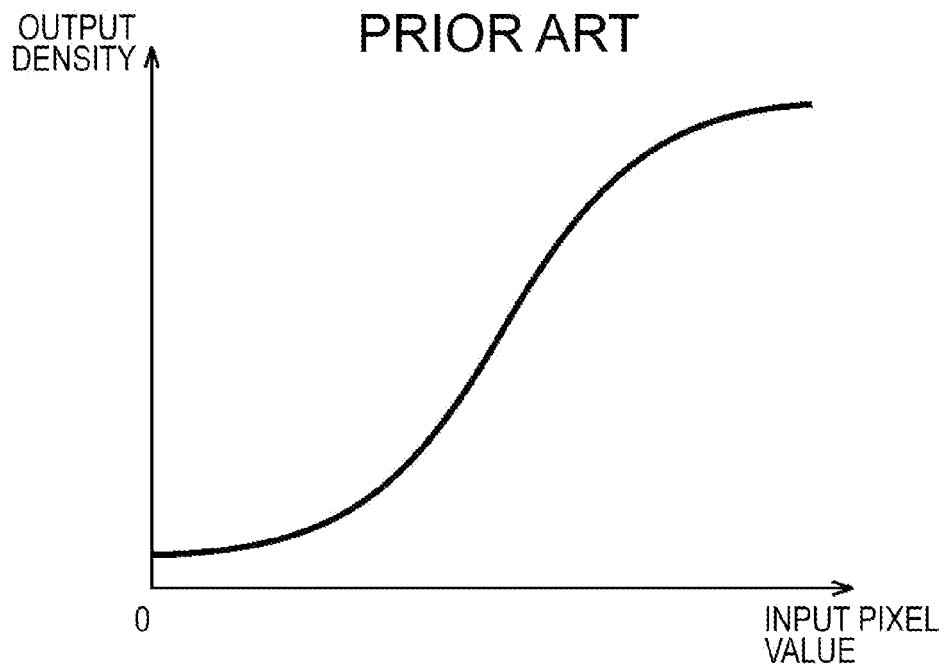
FIG. 8 is a prior art schematic diagram showing a characteristic curve representing the relationship between an input pixel value and an output density used in typical gray scale transformation.
Figure 9:
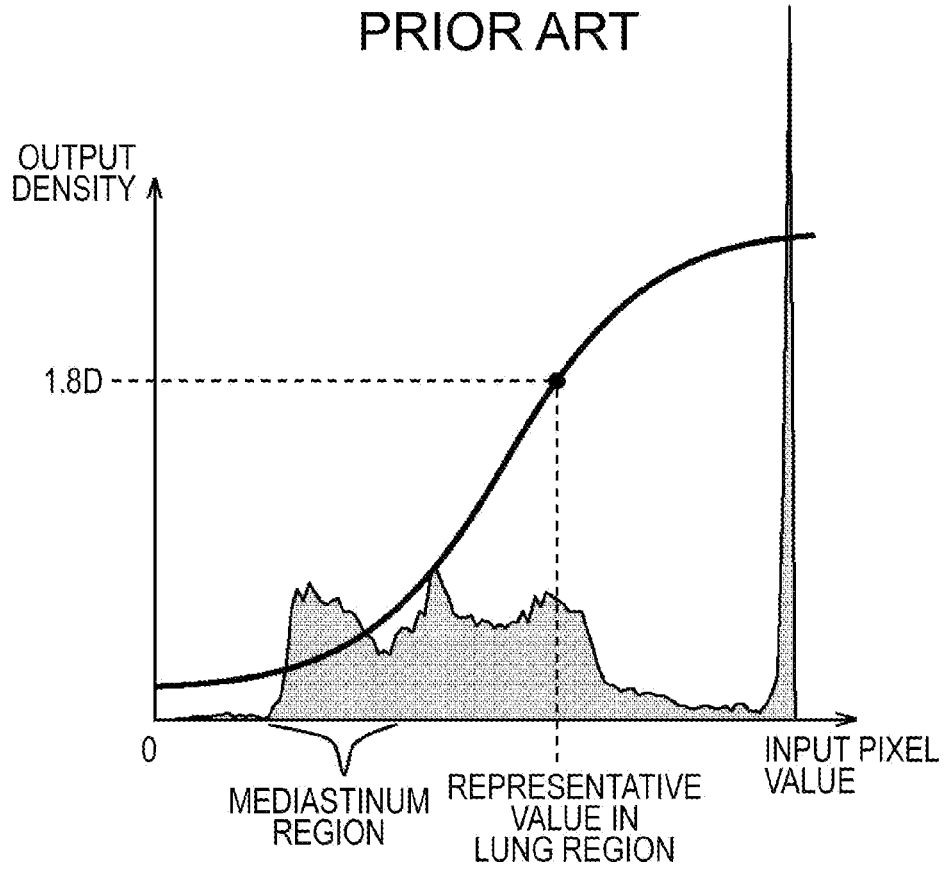
FIG. 9 is a prior art schematic diagram explaining an example of a method for transforming the gray scale of image data relating to photography in chest.
Figure 10:
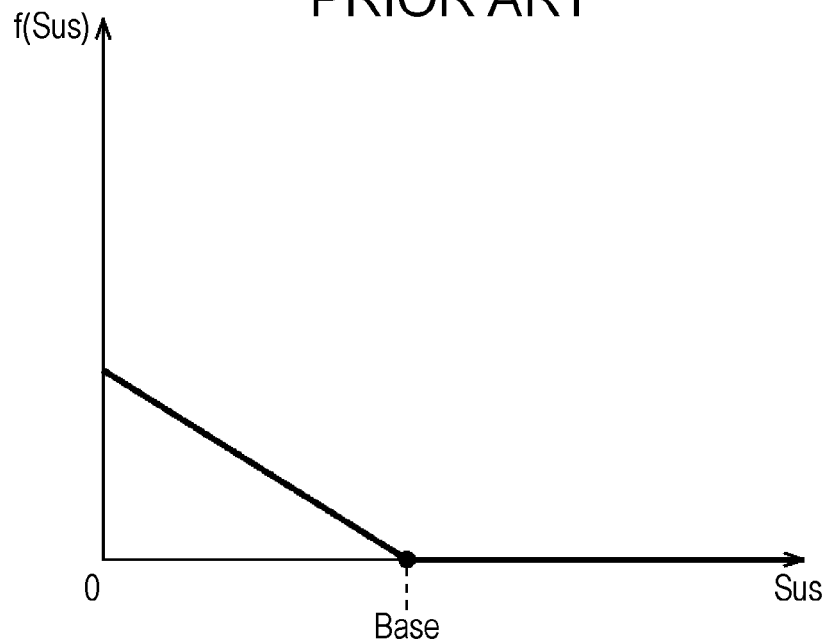
FIG. 10 is a schematic diagram illustrating a dynamic range transformation function.
Figure 11:
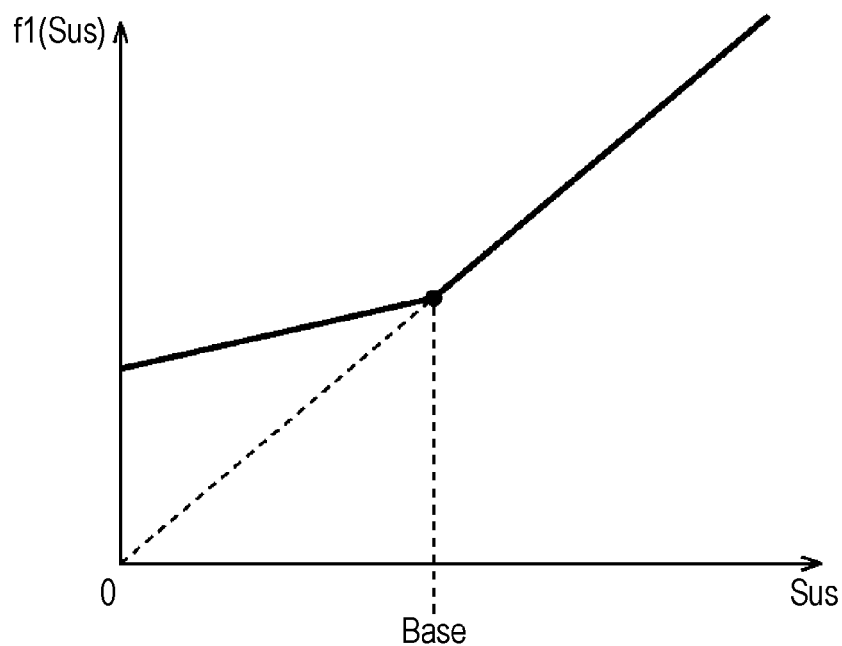
FIG. 11 is a schematic diagram illustrating another dynamic range transformation function.

FIG. 7 is a flowchart showing an exemplary procedure of the X-ray photographing apparatus (image processing apparatus) according to the second embodiment of the present invention. Specifically, the process in the flowchart of FIG. 7 is carried out when the CPU 106 executes a program stored in the main memory 107 to control the image processing circuit 111. In the flowchart of FIG. 7, the same processing steps as those in the flowchart of FIG. 2 are designated by the same step numbers. Processing steps different from those in the above-described first embodiment will be specifically described below.

Steps S201 to S206 in FIG. 2 are carried out in the process shown in FIG. 7.

In step S301, the dynamic range transforming circuit 1113 resolves an input image (original image) into frequency components. A method of frequency resolution is not especially limited. For example, a method of resolving an image X into two frequency components, i.e., a low frequency component L and a high frequency component using a low-pass filter g as expressed by the following expression (16) may be used.

$$L = g * X$$

$$H = X - L \quad (16)$$

In the expression (16), let * be convolution integral. As for the low-pass filter g in the expression (16), a moving average filter or a Gaussian filter may be used.

In step S302, the dynamic range transforming circuit 1113 transforms pixel values of the input image, which has undergone frequency resolution in step S301, using the dynamic range transformation function f( ) calculated in step S206. Specifically, the frequency components resolved in step S301 are transformed using the following expression (17) on the basis of the dynamic range transformation function f( ). Consequently, a pixel value Y(i, j) in which the dynamic range is transformed is obtained.

$$Y(i,j) = f(L(i,j)) + H(i,j) \quad (17)$$

In the expression (17), since the dynamic range is transformed with respect only to the low frequency component L, contrast in a fine-structure portion included in the high frequency component can be kept (maintained).

In step S303, the gray scale transforming circuit 1114 transforms the input-image pixel value, transformed in step S302 by the dynamic range transforming circuit 1113, using the gray scale transformation function D( ) calculated in step S201. The process of FIG. 7 then terminates.

The second embodiment has an advantage in that the contrast in the fine-structure portion included in the high frequency component can be kept (maintained) in addition to the advantage in the first embodiment.

In the second embodiment, the input image is subjected to frequency resolution using the expression (16). The present embodiment is not limited to this case. For example, the wavelet transformation or the Laplacian pyramid may be used. In other words, the technical idea of the present embodiment may be applied to a case using another frequency resolution. The present embodiment has been described with respect to the case where the image is resolved into two frequency components. As will be understood by those skilled in the art, an image may be resolved into three or more frequency components.

The steps, in each of FIGS. 2 and 7, describing the method for image processing for the X-ray photographing apparatus (image processing apparatus) according to each embodiment of the present invention can be implemented by execution of a program stored in a RAM or ROM in a computer. The present invention also includes the program and a computer-readable storage medium on which the program is recorded.

Specifically, the program is recorded on a storage medium, such as a CD-ROM, and is then supplied to the computer. Alternatively, the program is supplied to the computer through various transmission media. In addition to the CD-ROM, examples of the storage medium for recording the program include a flexible disk, hard disk, magneto-optical disk, MO, CD-R, CD-RW, magnetic tape, nonvolatile memory card, ROM, DVD-ROM, and DVD-R.

For example, the program can be supplied by connecting to a web page on the Internet by using a browser of a client computer and downloading the program itself from the web page to a recording medium, such as a hard disk. Alternatively, the program can also be supplied by downloading a compressed file, relating to the program and including an automatic installation function, from the web page to a recording medium, such as a hard disk. It is also possible to divide a program code, constituting the program, into a plurality of files, and download the individual files from different web pages. In other words, the present invention also includes a WWW server which allows a plurality of users to download files relating to the program for implementing the functional processing of the present invention by a computer.

In addition, the program can be encrypted and be stored in a storage medium, such as a CD-ROM. The storage media containing the encrypted program can be distributed to users. A user who has cleared predetermined conditions is allowed to download key information for decryption from a web page over the Internet. In this case, the user executes the encrypted program using the key information and installs the program in a computer.

The functions of the above-described embodiments of the present invention are implemented by executing the read-out program through a computer. In addition, the functions of the above-described embodiments may be implemented by, for example, allowing an OS running on the computer to perform part or the whole of actual processing on the basis of instructions of the program.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2008-005764 filed Jan. 15, 2008, which is hereby incorporated by reference herein in its entirety.

What is claimed is:

1. An image of a subject processing apparatus comprising:
   a first unit configured to set a first transformation curve based on a representative pixel value of the subject;
   a second unit configured to set first input pixel values based on predetermined output pixel values of the first transformation curve;
   an input pixel value setting unit configured to set a second input pixel values set based on a pixel value range of the subject area; and
   a dynamic range transforming unit configured to perform a process for transforming pixel values of the input image using a second transformation curve in which the second input pixel values become the first input pixel values, wherein
   the second transformation curve is generated so that the gradient at the representative pixel value becomes a predetermined value based on the pixel value range of the subject area.

2. The apparatus according to claim 1, wherein the predetermined value is 1.

3. The apparatus according to claim 1, wherein the second transformation curve is a function in which the gradient generally monotonically increases or decreases in a range between the two different pixel values.

4. The apparatus according to claim 1, wherein at least one of the second input pixel values is calculated from a predetermined region within the subject area.

5. The apparatus according to claim 1, wherein at least one of the second input pixel values set by the input pixel value setting unit is a maximum or minimum value of pixel values in the subject area.

6. The apparatus according to claim 1, wherein when a second input pixel value is $x_{roi}$, output first pixel value corresponding to a second input pixel value is $f_{roi}$, a maximum value, which serves as the second input pixel value, of the pixel values in the subject area is $x_{max}$, a first input pixel value corresponding to the second input pixel value is $f_{max}$, and a transformation function representing the second transformation curve is $f_u(x)$, the dynamic range transforming unit performs a process for transforming a part or all of pixel values in a region including pixel values at or above the second input pixel value $x_{roi}$ in the input image using the transformation function $f_u(x)$ expressed by the following expression (1)

$$f_u(x) = (f_{roi} - f_{max}) \times \left(\frac{x_{max} - x}{x_{max} - x_{roi}}\right)^{\frac{1}{\gamma_u}} + f_{max} \quad (1)$$

$$\gamma_u = \frac{f_{max} - f_{roi}}{x_{max} - x_{roi}}.$$

7. The apparatus according to claim 1, wherein when the second input pixel value is $x_{roi}$, a first input pixel value corresponding to the second input pixel value is $f_{roi}$, a minimum value, which serves as the second input pixel value, of the pixel values in the subject area is $x_{min}$, a first input pixel value corresponding to the second input pixel value is $f_{min}$, and a transformation function representing the second transformation curve is $f_l(x)$, the dynamic range transforming unit performs a process for transforming a part or all of pixel values in a region including pixel values below the second input pixel value $x_{roi}$ in the input image using the transformation function $f_l(x)$ expressed by the following expression (2)

$$f_l(x) = (f_{roi} - f_{min}) \times \left(\frac{x - x_{min}}{x_{roi} - x_{min}}\right)^{\frac{1}{\gamma_l}} + f_{min} \quad (2)$$

$$\gamma_l = \frac{f_{roi} - f_{min}}{x_{roi} - x_{min}}.$$

8. The apparatus according to claim 6, wherein the dynamic range transforming unit sets a maximum limit $a_{max}$ ($a_{max} > 1$) and a minimum limit $a_{min}$ ($a_{min} < 1$) of the gradient in the second transformation function $f_u(x)$ and transforms pixel values in a region including pixel values which satisfy $a_{max} = f'_u(x_a)$ or $a_{min} = f'_u(x_a)$ and which are at or above a pixel value $x_a$ in the input image using the following expression (3)

$$f_{un}(x) = a(x - x_a) + f_u(x_a) \quad (3)$$

$$a = \begin{cases} a_{min}, & \gamma_u < 1 \\ 1, & \gamma_u = 1 \\ a_{max}, & \gamma_u > 1 \end{cases}.$$

9. The apparatus according to claim 7, wherein the dynamic range transforming unit sets a maximum limit $a_{max}$ ($a_{max} > 1$) and a minimum limit $a_{min}$ ($a_{min} < 1$) of the gradient in the second transformation function $f_l(x)$ and transforms pixel values in a region including pixel values which satisfy $a_{max}=f'_l(x_a)$ or $a_{min}=f'_l(x_a)$ and which are at or below a pixel value $x_a$ in the input image using the following expression (4)

$$f_{lm}(x) = a(x - x_a) + f_l(x_a) \quad (4)$$

$$a = \begin{cases} a_{min}, & \gamma_l < 1 \\ 1, & \gamma_l = 1 \\ a_{max}, & \gamma_l > 1 \end{cases}$$

10. A method for image of a subject processing, the method comprising:
    setting a first transformation curve based on a representative pixel value of the subject;
    setting first input pixel values based on predetermined output pixel values of the first transformation curve;
    setting a second input pixel values set based on a pixel value range of the subject area; and
    performing a process for transforming pixel values of the input image using a second transformation curve in which the second input pixel values become the first input pixel values, wherein the second transformation curve is generated so that the gradient at the representative pixel value becomes a predetermined value based on the pixel value range of the subject area.

11. A non-transitory computer-readable storage medium storing a computer-executable process, the computer-executable process causing a computer to implement the steps comprising:
    setting a first transformation curve based on a representative pixel value of the subject;
    setting first input pixel values based on predetermined output pixel values of the first transformation curve;
    setting a second input pixel values set based on a pixel value range of the subject area; and
    performing a process for transforming pixel values of the input image using a second transformation curve in which the second input pixel values become the first input pixel values, wherein the second transformation curve is generated so that the gradient at the representative pixel value becomes a predetermined value based on the pixel value range of the subject area.

* * * * *